June 30, 1953  E. G. SCHNEIDER  2,644,156
RANGE SELECTOR CIRCUIT

Filed March 22, 1945  3 Sheets-Sheet 1

INVENTOR.
EDWIN G. SCHNEIDER

BY
*William D. Hall,*
ATTORNEY

June 30, 1953     E. G. SCHNEIDER     2,644,156
RANGE SELECTOR CIRCUIT
Filed March 22, 1945     3 Sheets-Sheet 2

INVENTOR.
EDWIN G. SCHNEIDER
BY *William D. Hall.*
ATTORNEY

June 30, 1953  E. G. SCHNEIDER  2,644,156
RANGE SELECTOR CIRCUIT
Filed March 22, 1945  3 Sheets-Sheet 3

FIG. 3

INVENTOR.
EDWIN G. SCHNEIDER
BY
William D. Hall.
ATTORNEY

Patented June 30, 1953

2,644,156

UNITED STATES PATENT OFFICE 2,644,156

RANGE SELECTOR CIRCUIT

Edwin G. Schneider, Watertown, Mass., assignor, by mesne assignments, to the United States of America as represented by the Secretary of War Application March 22, 1945, Serial No. 584,234

17 Claims. (Cl. 343—13)

This invention relates to electrical circuits and more particularly to timing circuits.

In many applications of timing circuits it is desirable to produce a second indication a predetermined time after a first indication. The time interval between the two indications in many cases must be variable and may have to be accurate to a very small interval of time, for example, one microsecond or less.

One example of this use of a timing circuit is in the display of range information on a cathode ray tube. In this application target pips appear on a sweep or time base, and the distance from the start of the sweep to a target pip is a measure of the distance to the target. Since the time base may have to cover a relatively long interval of time, it is desirable to have some means of causing an indication to coincide with the target and have the controls that cause the movement of this indication calibrated to read the range to the target. The method just described is usually a much more accurate method of measuring the range to the target than is the method of reading the range from calibrations on the cathode ray tube screen.

It may be desirable at times to select a portion of the time base of one cathode ray tube and present this portion to an expanded scale on a second cathode ray tube. This may be used to increase the accuracy of the method of range measurement described above, or it may be used when an indication or a group of indications on the first cathode ray tube is to be isolated for closer inspection.

It is an object of this invention, therefore, to present a circuit for producing a second indication at a time after a first indication, the time interval between said indications being continuously adjustable and the length of said time interval being accurately indicated on suitable indicating means.

Another object of this invention is to provide a circuit employing the invention for displaying information on two or more cathode ray tubes, one or more of these cathode ray tubes presenting a portion of the time base presented by one or more of the other cathode ray tubes.

In accordance with the present invention, there is provided a means for introducing a first indication or pulse. This first pulse activates a delay circuit that produces a first control pulse at a predetermined time after the first indication. The time between the first indication and the first control pulse is variable in steps. The first control pulse is used to activate a vernier delay circuit. This vernier circuit produces a second control pulse. The time interval between the first and second control pulses is continuously variable from zero to at least the time represented by the longest interval between consecutive control pulses of the step delay circuit. The second control pulse is used to cause a second indication. A suitable indicator means is associated with the step delay circuit and the vernier delay circuit to indicate the time interval between the first indication and the second indication.

For a better understanding of the invention, together with other and further objects thereof, reference is had to the following description, taken in connection with the accompanying drawings, and the scope of the invention will be pointed out in the appended claims.

In the accompanying drawings.

Figure 1:
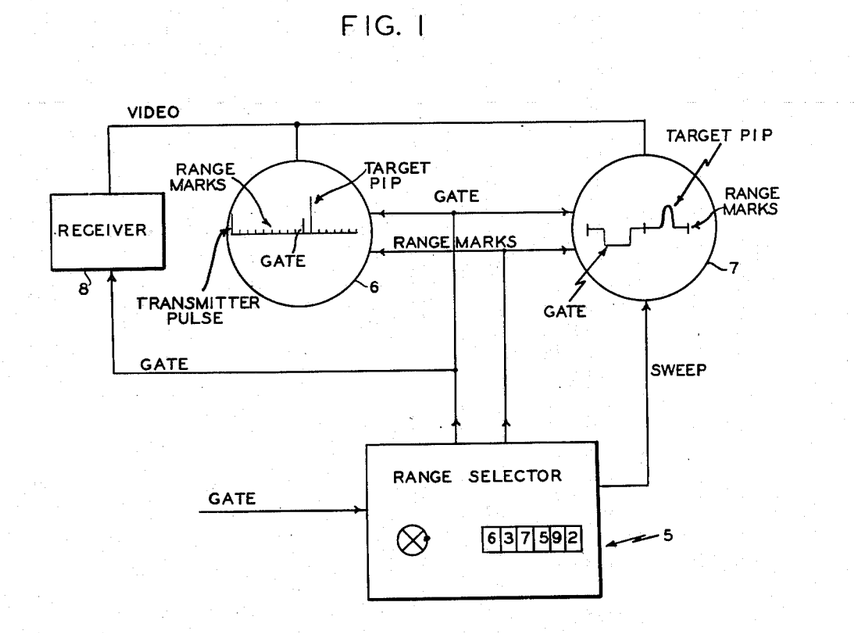
Fig. 1 is a block diagram of a system in which one form of the invention is incorporated.
Figure 1A:
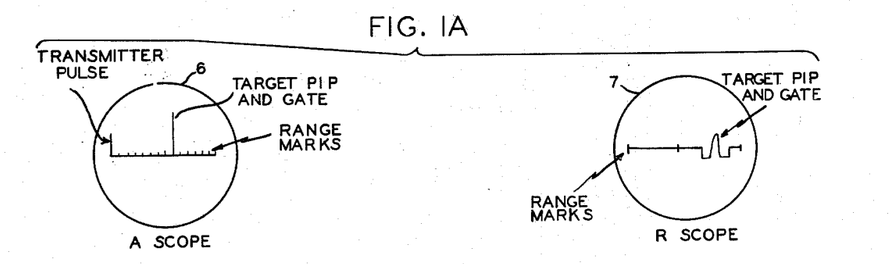
Fig. 1A is a second view of the cathode ray tube screens shown in Fig. 1.

Referring now more particularly to Fig. 1, there is shown a system block diagram which includes one embodiment of the invention. Mainly, the invention is incorporated in a block 5 marked range selector in Fig. 1. Two cathode ray tubes 6 and 7 are employed to display the desired information such as the range to a target or the time interval between the time a pulse is radiated from a radio set and the time an echo is received by the radio set. In the example illustrated by Fig. 1 cathode ray tube 6 is connected as an "A scope," that is, the electron beam is made to travel across the cathode ray tube screen at a substantially uniform rate to form what is known as a time base. The distance from the start of the trace on the screen to any point on the trace represents a fixed interval of time. Some form of indication such as a pip is made to appear on this time base at the time an echo is received at the receiver. The position of the pip on the time base represents the elapsed time between the time a pulse is transmitted from the radio set and the time an echo is received from a target. The time base on cathode ray tube 6 is made to represent a relatively long time interval, usually equal to the greatest time interval between pulse and echo likely to be encountered in the particular radio system being considered. Cathode ray tube 7 is connected as an "R scope" in that it has a time base similar to the "A scope," but a gate or depression is made to appear in the sweep. The gate may be made to move across the time base at the will of the operator. In this instance the "R scope" 7 is made to display on an expanded scale a selectable portion of the time base of the "A scope" 6. Receiver 8 converts the received target echoes into the video signals that are applied to cathode ray tubes 6 and 7. Receiver 8 also contains a channel capable of being gated in time. The gate to activate this channel of receiver 8 is supplied by range selector 5. Range selector 5 also supplies a gate to cathode ray tubes 6 and 7. This gate appears much wider on "R scope" 7 than it does on "A scope" 6 due to the expanded time scale of "R scope" 7. Fig. 1 shows the appearance of the "A scope" 6 and "R scope" 7 when the depression on the "R scope" time base, caused by the gate from range selector 5, does not coincide with the target pip, and Fig. 1A shows the appearance of "A scope" 6 and "R scope" 7 when the depression and the target pip coincide. The means by which the depression and target pip are made to coincide and the means by which the portion of the "A" time base is selected is the subject of one embodiment of this invention and will be fully described in connection with Figs. 2 and 3.

Figure 2:
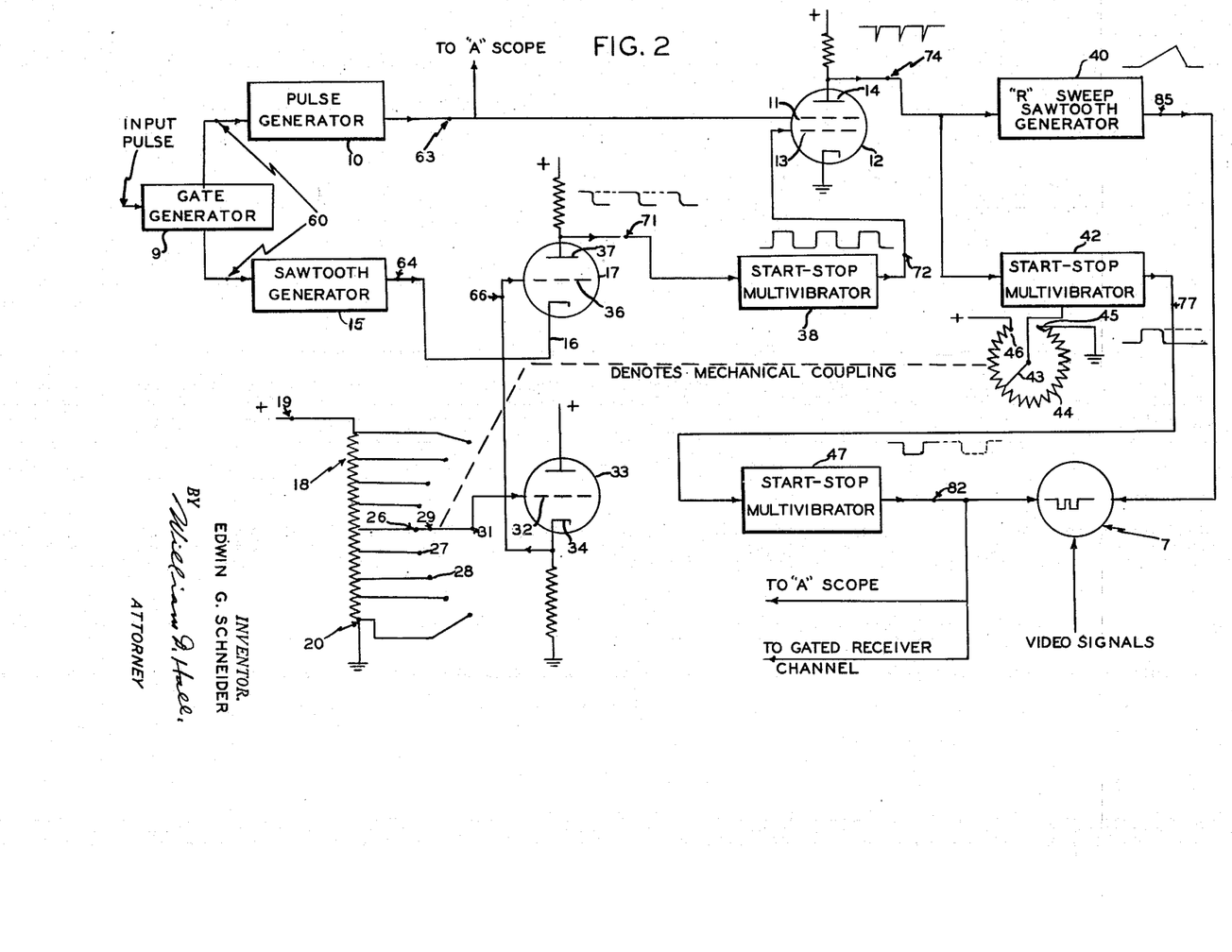
Fig. 2 is a block diagram of one embodiment of the invention showing the relationship of the various component parts of the invention.

Referring now to Fig. 2, there is shown in block diagram form the circuit arrangement contained in the range selector 5 of Fig. 1. "R scope" 7 of Fig. 1 is also included in the arrangement in Fig. 2 as it will be referred to in the description of Fig. 2. Certain parts in Fig. 2 are shown in schematic form to facilitate the description of this circuit. In these schematic drawings only connections essential to the understanding of the invention are shown, and, therefore, such details of circuit construction as coupling capacitors, grid resistors, suppressor grids, and so forth are not shown. It is to be understood that the following description presents a preferred embodiment of the invention, and at certain points wave forms and time intervals will be referred to. It is not intended that the wave forms shown or the time intervals indicated should be interpreted as limiting the invention to the values shown.

A gate generator 9 is coupled to a range mark generator 10. This gate generator 9 is capable of producing at its output a relatively long voltage pulse or gate beginning at the time a suitable trigger is applied to the generator 9. The pulse generator 10 is a gated oscillator for producing sharp voltage peaks at predetermined intervals of time. This oscillator 10 may be any of the types well known to the art, and it is made operative by a gate from generator 9. The output of generator 10 is fed to a grid 11 which is one of two grids of coincidence tube 12. The other grid is identified by the number 13. This coincidence tube 12 operates in a manner well known to the art in that a signal must be present on the grid 11 and the grid 13 before an output is obtained at anode 14.

Gate generator 9 is also connected to saw tooth generator 15 which is also made operative by a voltage pulse or gate from the generator 9. The time duration of the gate applied to generator 15 will usually be of approximately the same time duration as the gate applied to range mark generator 10. The output of this saw tooth generator 15 is applied to a cathode 16 of an electron tube 14.

A tapped resistor 18 is connected as a voltage divider between a source of constant direct current potential and some fixed reference potential. The polarity and magnitude of this voltage will depend on the details of the circuits used in connection with this resistor; but for facility in explanation, one end 19 of this resistor is connected to a fixed positive potential, and a second end 20 of this resistor 18 is connected to ground. As several of the taps of this resistor will be referred to later, three of the taps are given the numbers 26, 27, and 28. A contact arm 29 may be made to connect point 31 to any of the taps of the resistor 18. The point 31 is connected to a grid 32 of a vacuum tube 33. Vacuum tube 33 is connected as a conventional cathode follower so that the potential of a cathode 34 of this tube will vary with the potential on the grid 32. This cathode 34 is connected to grid 36 of vacuum tube 17. Anode 37 of tube 17 is coupled to multivibrator 38 by suitable means. This multivibrator 38 is of the type that is normally inoperative but when triggered by a pulse, it forms a second pulse. The time duration of this second pulse is determined by the circuit constants of the multivibrator 38. This type of multivibrator is known to the art as a "start-stop" or a "one-shot" multivibrator. The output of the multivibrator 38 is applied to the grid 13 of the tube 12. Anode 14 of coincidence tube 12 is connected to a sweep generator 40. The output of this generator is usually a saw tooth wave form and is used to form the sweep or time base of the "R scope" 7. Anode 14 of coincidence tube 12 is also connected to a second start-stop multivibrator 42. The time duration of the pulse from this multivibrator is controlled by the position of an arm 43 on a potentiometer 44. Potentiometer 44 is part of the circuit of multivibrator 42 but is shown externally, as its function is to be described in detail in connection with the operation of the arrangement shown in Fig. 2.

Potentiometer 44 is connected between a fixed positive voltage and ground. This potentiometer is so constructed that the contact arm 43 may move continuously from end 45 around the resistor to end 46 and then pass directly to end 45. It may also be moved in the reverse direction. Since the use of this device to cause a variation in the width of a pulse from a multivibrator is well known to the art, it will not be described further.

The output of multivibrator 42 is fed to a third start-stop multivibrator 47 and the output of multivibrator 47 is connected to the "R scope" 7. The output of multivibrator 47 is also fed to "A scope" 6 shown in Fig. 1 and to receiver 8 also shown in Fig. 1. It is recognized that modifications could be made in the circuit arrangement as described without departing from the basic idea of the invention. It is further recognized that the actual method of connecting resistor 18, tube 33, and tube 17 may be done in many ways without changing the function performed by these elements. Multivibrators 38, 42, and 47 have been referred to as "start-stop" multivibrators and the action of this type of multivibrator described. It is recognized that a type of multivibrator known as the unbalanced multivibrator in which one half of the cycle is so long compared to the time intervals used in this application that it may be considered a start-stop multivibrator and may be substituted for the start-stop multivibrator in many applications. If this is the case, the connections of resistor 44 might require modification, but the modifications necessary are well understood to those skilled in the art and will not be described here.

Figure 3:
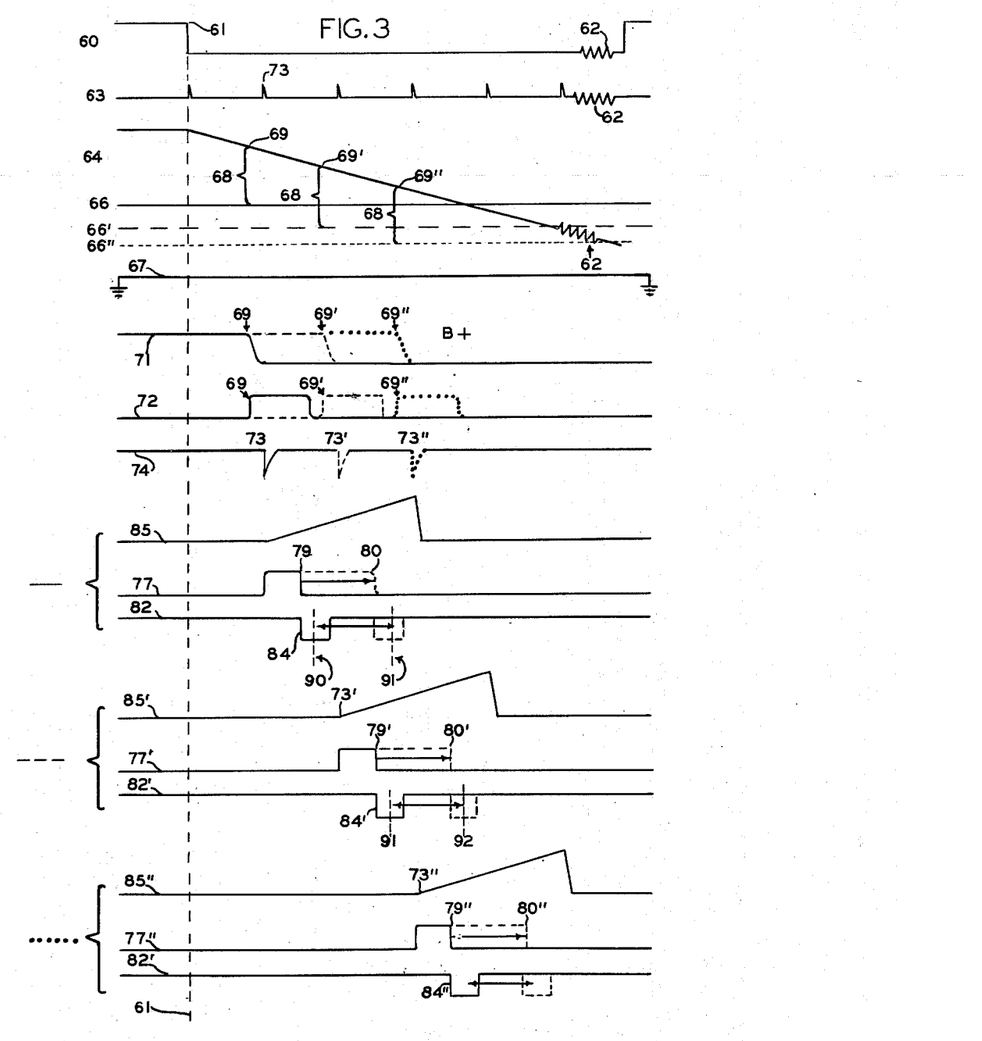
Fig. 3 is a set of theoretical curves that may be obtained from the circuit of Fig. 2.

Referring now to Fig. 3, there is shown a set of wave forms that might be obtained from the circuit arrangement of Fig. 2. The operation of the apparatus of Fig. 2 may be better understood by reference to the wave forms shown in Fig. 3. For convenience of reference the wave forms are numbered in Fig. 3 and corresponding numbers are shown in Fig. 2, showing the point where these wave forms might be obtained.

Wave form 60 is the output of gate generator 9 and is the gate applied to both range mark generator 10 and saw tooth generator 15. The number 61 designates a predetermined reference time during the operation of the apparatus shown in Fig. 2. The pulse that is applied to gate generator 9 occurs at time 61. The number 62 on this and successive wave forms indicates a break in time since there is not sufficient space available to show all wave forms completely at the same time scale. The gate formed in wave form 60 continues for a time approximately equal to the longest delay that the apparatus is required to produce. Wave form 63 is the output of pulse generator 10 and comprises a series of pulses. These pulses occur at predetermined intervals of time. The output of saw tooth generator 15 is a negative going saw tooth described by wave form 64. This wave form is such that cathode 16 of tube 17 is at a potential above grid 36 sufficient to cause tube 17 to be cut off. Since the saw tooth of wave form 64 goes in a negative direction, the potential of cathode 16 with respect to some fixed reference potential will decrease with time. Wave form 66 indicates the potential of the grid 36 above a point of reference potential 67 for a particular setting of contact arm 29. In this example it is assumed that contact arm 29 is in contact with point 26. Wave forms 66' and 66'' indicate the potential of grid 36 as contact arm 29 is moved to contacts 27 and 28 respectively. Potential difference 68 indicates the critical potential of the cathode 16 above the grid 36 just sufficient to cause the tube to be cut off. This occurs at times marked by numbers 69, 69', and 69'' during the operation of the apparatus in Fig. 2. It will be seen that before time 69, the cathode 16 is above the grid 36 by an amount greater than the critical potential 68. Therefore, the tube 17 is cut off. Wave form 71 shows the potential on anode 37 of tube 17. Anode 37 is at B+ potential when the tube is cut off but after time 69 on curve 71, the tube 17 starts to conduct, and anode 37 drops in potential. This drop in potential is used to trigger multivibrator 38. The output of multivibrator 38 is shown as wave form 72. The output wave form 72 of multivibrator 38 has a positive pulse that begins at time 69 when contact arm 29 is in contact with point 26. 69' and 69'' indicate the time that the drop would occur if contact arm 29 were moved to points 27 and 28 respectively. At a time 73 a positive voltage will be present on grids 11 and 13 of vacuum tube 12 so that tube 12 conducts. Anode 14 drops in potential as shown by wave form 74. 73' and 73'' indicate the times that the respective drops will occur when contact arm 29 is moved to points 27 and 28 respectively. It will be noted that time 73 or 73' or 73'', as the case may be, always occurs at a time NT after the reference time 61 where N is an integer and T is the time between any two pulses in the output of pulse generator 10. The portion of the invention described to this point is referred to as a step delay apparatus.

The pulse that occurs in wave form 74 is used to trigger multivibrator 42. The output of this multivibrator is a pulse that may be similar to the wave form numbered 77. The pulse in this wave form begins at time 73 and continues for a time interval that may be varied so that the end of the pulse may lie anywhere between time 79 and time 80. The time duration of the pulse is determined by the setting of contact arm 43 on potentiometer 44. With the tap at one end of the resistor 44 the pulse will end at time 79, and with the tap at the other end the pulse will end at time 80. Intermediate settings of arm 43 will cause the pulse to end at intermediate times. The circuit comprising multivibrator 42 and resistor 44 is a vernier delay circuit that provides a continuous delay over a time interval equal to the longest step produced by the step delay circuit. The end of the pulse in wave form 77 is utilized to trigger multivibrator 47. The output of multivibrator 47 is a negative pulse 84 as shown in wave form 82. The width of the pulse 84 in wave form 82 will depend on the design of the circuit of multivibrator 47 and the particular application in which this circuit is used. It is obvious that the time at which the pulse 84 appears in wave form 82 depends on two variable factors, the position of tap 29 on resistor 18 and the position of tap 43 on resistor 44. To adjust the time delay between time 61 and the pulse 84 in wave form 82, tap 29 is moved in steps to give a rough adjustment of the time delay; and then resistor 43 is adjusted to give the exact time delay desired. This is similar to the problem of obtaining a resistance of, say, 97 ohms on a decade resistance box. In this problem the first setting is the coarse adjustment of 90 on the "tens" dial, and the second setting is 7 on the "units" dial. It is possible to have the value of resistor 44 vary in steps, but if the resistor is made continuously variable, the time delay is also continuously variable.

It is a simple matter to apply the time delay circuit as described above to a system for measuring range or time delay on two or more cathode ray tubes. The output of coincidence tube 12 is used to trigger a saw tooth generator 40 of Fig. 2. The output of this generator is shown as wave form 85 in Fig. 3. The saw tooth generated is used as the sweep on "R scope" 7. It will be noted that the saw tooth in wave form 85 begins at the same time as the pulse in wave form 77. The output of start-stop multivibrator 47 of Fig. 2 is fed to "R scope" 7 in such a manner that a depression will be formed in the time base of "R scope" 7 due to the pulse 84 in the output of multivibrator 47. The sweep for the "A scope" 6 of Fig. 1 may be obtained from saw tooth generator 15 of Fig. 2 or any similar generator synchronized with this generator 15. An added refinement in the use of this circuit is to mechanically couple resistors 44 and 18 so that the tap 29 on resistor 18 moves one step for every revolution of tap 43 on resistor 44. The coupling is so arranged that the tap 29 on resistor 18 moves at the instant that the tap 43 on resistor 44 crosses from the maximum point to the minimum point. This permits the continuous adjustment of the time delay from zero to the maximum limit using only one control knob or handle. As was stated, this is only an added convenience, and the circuit could be made to operate satisfactorily if the resistors were not so coupled.

The operation of the embodiment of the invention employed in range measuring circuits may best be understood by reference to the following example. Let it be assumed that time 61 is the time that a pulse of energy is radiated from the range measuring system. Assume further that a target appears at such a range that the echo reaches the receiver at a time after time 61 equal to the time delay set by taps 43 and 29 on resistors 44 and 18 plus half the time width of the pulse 84 in wave form 82. This will mean that the target pip on the "R scope" will be centered in the depression in the time base formed by the pulse in wave form 82. This condition is shown in Fig. 1–A. The range indicator that is mechanically coupled to resistors 18 and 44 may be calibrated to read the range in yards or miles to the target.

Suppose the range to the target is increasing so that the elapsed time between radiated pulse and received echo is increasing. Arm 43 of the potentiometer is moved so that the gate formed by pulse 84 in wave form 82 stays centered about the target pip. In this case, arm 29 of resistor 18 is assumed to be in contact with point 26. The sweep on the "R scope," therefore, would start at time 73. The target would appear near the left hand edge of the screen on "R scope" 7 and move across the time base from left to right. Suppose the range increases so that the pulse in wave form 77 ended at time 80. This would means that contact arm 43 was at one end, say end 46, of resistor 44. The target pip would then be occurring at time 91. If the target continued to move out in range and arm 43 of potentiometer 44 was moved to follow the target, arm 43 would move from end 46 to end 45. This would cause arm 29 on resistor 18 to move from point 26 to point 27. This causes the potential on grid 36 of tube 17 to be that shown in wave form 66'. This in turn causes the sweep on the "R scope" to begin at time 73'. The end of the pulse in wave form 77' would end at time 79'. This would cause the gate as seen on the screen of "R scope" 7 to jump to the left hand side of the "R scope" screen, but since the sweep starts at a later time, the target pip will still be centered in the gate. The gate can then be made to follow the target in range as the range increases until the target reaches time 92. At this time arm 43 will again cross over between ends of resistor 44 and contact arm 29 on resistor 18 will move to point 28. The operation of the circuit is very similar if the range to the target is decreasing and, therefore, needs no explanation. Arm 43 of resistor 44 will turn in a reverse direction, and contact arm 29 will move over the contact points in the reverse order.

Under normal conditions a target usually would not appear at a range that would cause it to be centered in the depression caused by the pulse in wave form 82. In many cases the target would not be present on the "R scope" 7 because the "R scope" displays only a very small portion of the time base of the "A scope" 6 shown in Fig. 1. It would be convenient if a pip appeared on the time base of the "A scope" to indicate the position in time of the pulse 84 in wave form 82. This is accomplished by applying the output of multivibrator 47 to the "A scope" 6. In order to measure range to any target pip appearing on the "A scope" 6, the pip caused by pulse 84 is made to coincide with the selected target pip by adjusting contacts 43 and 29. When the pip caused by pulse 84 is made to coincide with the target pip on the "A scope" 6, the portion of the "A scope" sweep selected for display on the "R scope" will contain the target echo so that the exact coincidence between the gate caused by pulse 84 and the target pip may be accomplished on the "R scope" 7. From this point on the problem of following the target in range is exactly the same as the example already described.

In many radio applications it may be convenient to have a channel of a receiver gated in time in such a manner that only the echoes from a selected target are passed by this channel. It will be obvious to those skilled in the art that the output from multivibrator 47 may be fed to such a gated receiver channel to supply the gate. The only target signals that will pass through the gated receiver channel will be those targets that appear in the depression in the "R scope" time base.

The output of pulse generator 10 is a series of voltage pulses that are usually equally spaced relative to time. These pulses may be fed to the "A scope" in such a manner that the pulses form range marks on the time base of the "A scope" for visually estimating the range to any target appearing on the "A scope" 6. It is possible to arrange a suitable automatic tracking device such that once the depression formed in the time base of the "R scope" by pulse 84 is made to coincide with a target pip, arms 29 and 43 will be positioned automatically so as to follow the selected target in range.

From the above description it will be clear that in accordance with the invention, in a radar system of the type wherein energy pulses are recurrently transmitted at a regular repetition rate and echo pulses are received from within a predetermined maximum range in a chosen direction there is a range selector to provide gated reception of echoes from any chosen distance in the range and to indicate and measure the chosen distance. This selector is comprised of means for generating during each time interval of the repetition, and in particular during an interval immediately following the transmission of an energy pulse, a gating potential interval, by means of the unit 9, corresponding in time duration to the maximum range. There are also provided means responsive to the gating potential for generating during the gating interval a potential of saw-tooth wave form, the unit 15, and for generating a sequence of time-spaced pulses, the unit 10, which represents a scale of distance. There is also provided a control potential, the potentiometer 18 and switch 31, which is adjustable in steps, each potential step corresponding in order to a pulse in the sequence.

Also there is provided means comprising tubes 33 and 17 and multivibrator 38 which are responsive to the saw-tooth potential and a selected one of the potential steps to generate a selector pulse corresponding approximately to the major integral part of a chosen distance, this selector pulse having a duration encompassing a time interval during which a corresponding one of the time-spaced pulses occurs. There is also provided the means, vacuum tube 12, which is responsive to the coincidence of the selector pulse and the time-spaced pulses to select one of the time-spaced pulses corresponding exactly to the major integral part of the chosen distance.

Also, there are provided means comprising generator 40 for generating a time base and unit 42 for generating a vernier pulse, the time base representing the interval between the selected pulse and the following pulse in the sequence. In addition, there is provided delay means comprising a variable potential, the potentiometer 44, for adjusting the occurrence of the vernier pulse to a chosen time in the last-named interval to correspond to the fractional or vernier part of the chosen distance. Also, there is provided means, the gate connection to receiver 8 in Fig. 1, for utilizing the vernier pulse to gate the reception of the radar for the chosen distance and means comprising the oscilloscope 7 for indicating the vernier pulse relative to a received echo from the chosen distance. In addition, there are provided means, shown as a counter in 5 of Fig. 1, for indicating the selected potential step and the selected variable potential to provide a measure of the selected distance.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A circuit employing a plurality of cathode ray tubes for displaying time delay information and for applying a gate to a receiver channel, said circuit comprising means for supplying a synchronizing pulse, gate generator means responsive to said synchronizing pulse, pulse generator means responsive to the output of said gate generator means, first saw tooth generator means, a first control means comprising a variable voltage divider and a cathode follower, combining means for combining the output of said first saw tooth generator and the output of said first control means, first multivibrator means responsive to the output of said combining means, an electronic coincidence tube for combining the outputs of said pulse generator means and said first multivibrator means, second control means, second multivibrator means responsive to said second control means and the output of said coincidence tube, a third multivibrator means responsive to the output of said second multivibrator means, a second saw tooth generator means responsive to the output of said coincidence tube, a plurality of cathode ray tubes, radio receiver means, means for applying at least a portion of the output of said pulse generator means to at least one of said cathode ray tubes, means for applying at least a portion of the output of said second saw tooth generator to at least one of said cathode ray tubes, means for applying the output of said third multivibrator means to at least one of said cathode ray tubes, means for applying at least a portion of the output of said third multivibrator means to said receiver means, and means connected with said first and second control means for indicating the time interval between said synchronizing pulse and a pulse in the output of said third multivibrator means.

2. A circuit for producing a marker signal at a predetermined time after a reference signal, said circuit comprising a means for providing said reference signal, gate generator means responsive to said reference signal, pulse generator means for producing voltage pulses at predetermined intervals of time, said generator means being responsive to the output of said gate generator means, saw tooth generator means responsive to the output of said gate generator means, first control means comprising a variable voltage divider and a cathode follower stage, electronic combining means for combining the output of said first control means and the output of said saw tooth generator means; first multivibrator means responsive to the output of said combining means, an electronic coincidence tube for combining the output of said pulse generating means and the output of said first multivibrator means, second control means, second multivibrator means responsive to the output of said coincidence tube and said second control means, means for producing said marker signal, said last-mentioned means being responsive to the output of said second multivibrator, and means connected with said first and second control means to indicate the time interval between said marker signal and said reference signal.

3. A circuit for displaying the information contained in a predetermined portion of the time base of one cathode ray tube on a second cathode ray tube and means for causing an indication to move in a predetermined manner across the time base of at least one of said cathode ray tubes, said circuit comprising means for supplying a synchronizing pulse, gate generator means responsive to said synchronizing pulse, first pulse generator means for producing voltage pulses at predetermined intervals of time, said first pulse generating means being responsive to the output of said gate generator, saw tooth generator means responsive to the output of said gate generator means, first control means, first combining means for combining the output of said saw tooth generator means and said first control means, second pulse generating means responsive to the output of said first combining means, second combining means for combining the output of said first pulse generator and the output of said second pulse generator means; second control means; third pulse generator means, said generator means being responsive to said second control means and the output of said second combining means; sweep generator means, said generator means being responsive to the ouput of said second combining means; fourth pulse generator means responsive to the output of said third pulse generator means; a first and second cathode ray tube; means for applying a signal to said first and second cathode ray tube; means for applying the outputs of said sweep generator means and said fourth pulse generator means to said second cathode ray tube.

4. A circuit for causing a marker signal to occur at a predetermined time after a reference signal, the time interval between said marker signal and said reference signal being continuously adjustable, said circuit comprising means for providing said reference signal; gate generating means responsive to said reference signal; first pulse generator means for producing voltage pulses at predetermined intervals of time, said first pulse generating means being responsive to the output of said gate generating means, saw tooth generator means responsive to the output of said gate generator means, first control means, first combining means for combining the output of said saw tooth generator means and the output of said first control means, second pulse generator means responsive to the output of said first combining means, second combining means for combining output of said first pulse generator means and the output of said second pulse generator means; second control means, third pulse generator means responsive to output of said second combining means and said second control means, means for producing said marker signal, said last-mentioned means being responsive to the ouput of said third pulse generator means.

5. A circuit for displaying the information contained in a predetermined portion of the time base of a first cathode ray tube on a second cathode ray tube, said circuit comprising means for supplying a synchronizing pulse, gate generator means responsive to said synchronizing pulse, first pulse generator means for producing voltage pulses at predetermined intervals of time, said first pulse generating means being responsive to the output of said gate generator, saw tooth generator means responsive to output of said gate generator, a first control means, first combining means for combining the output of said saw tooth generator and said first control means, second pulse generating means, second combining means for combining the output of said first pulse generator and the output of said second pulse generator; sweep generator means, said sweep generator means being responsive to the output of said second combining means, first and second cathode ray tubes, means for applying a signal to said first and second cathode ray tubes, and means for applying the output of said sweep generator means to said second cathode ray tube.

6. A circuit for producing a marker signal at a predetermined time after a reference signal, the time between said marker signal and said reference signal being variable in steps, said circuit comprising means for providing said reference signal; gate generating means responsive to said reference signal; first pulse generator means for producing voltage pulses at predetermined intervals of time, said first pulse generating means being responsive to the output of said gate generating means; saw tooth generator means responsive to the output of said gate generator means; first control means; first combining means for combining the output of said saw tooth generator means and the output of said first control means; second pulse generator means responsive to the output of said first combining means; second combining means for combining output of said first pulse generator means and the output of said second pulse generator; and means responsive to said second combining means for producing said marker signal.

7. A circuit for displaying the information contained in a predetermined portion of the time base of one cathode ray tube on a second cathode ray tube and means for causing an indication to move in a predetermined manner across the time base of at least one of said cathode ray tubes, said circuit comprising means for supplying a synchronizing pulse; a step delay circuit responsive to said synchronizing pulse said step delay circuit comprising a generator of equally time-spaced pulses and a pulse selector circuit; a vernier delay circuit responsive to the output of said step delay circuit; sweep generator means responsive to the output of said step delay circuit; pulse generator means responsive to the output of said vernier delay circuit, a first and second cathode ray tube, means for applying a signal to said first and second cathode ray tube, means for applying the outputs of said pulse generator means and said sweep generator means to said second cathode ray tube.

8. A circuit for causing a marker signal to occur at a predetermined time after a reference signal, said circuit comprising means for providing said reference signal; a step delay circuit responsive to said reference signal said step delay circuit comprising a generator of equally time-spaced pulses and a pulse selector circuit; a continuously variable vernier delay circuit responsive to the output of said step delay circuit; means for producing said marker signal, said means being responsive to the output of said vernier delay circuit; and means connected with said step delay circuit and said vernier delay circuit for indicating the time interval between said marker signal and said reference signal.

9. A circuit for causing a marker signal to occur at a predetermined time after a reference signal, said circuit comprising means for providing said reference signal, a plurality of delay means connected in series, at least one of said delay means comprising a generator of equally time-spaced pulses and a pulse selector circuit which is responsive to said reference signal providing means, means for producing said marker signal, said last-named means being responsive to at least one of said delay means.

10. In a radio object detection system of the type wherein energy pulses are recurrently transmitted at a regular repetition rate and echo pulses are received from within a predetermined maximum range in a chosen direction, a range selector to provide gated reception of echoes from any chosen distance in said range and to indicate and measure said distance comprising, means for generating, during each time interval of said repetition, a gating potential interval corresponding in time duration to said maximum range, means responsive to said gating potential for generating during said gating interval a potential of saw tooth wave form and a sequence of time-spaced pulses representing a scale of distance, a source of control potential adjustable in steps, each potential step corresponding in order to a pulse in said sequence, means responsive to said saw tooth potential and a selected one of said potential steps to generate a selector pulse corresponding approximately to the major integral part of a chosen distance, said selector pulse having a duration encompassing a time interval during which a corresponding one of said time-spaced pulses occurs, means responsive to the coincidence of said selector pulse and said time-spaced pulses to select one of said time-spaced pulses corresponding exactly to said integral part of said chosen distance, means responsive to said selected pulse for generating a time-base and a vernier pulse, said time base representing the interval between said selected pulse and the following pulse in said sequence, delay means comprising a variable potential for adjusting the occurrence of said vernier pulse to a chosen time in said last-named interval to correspond to the fractional or vernier part of said chosen distance, means for utilizing said vernier pulse to gate the reception of the echo pulses for said distance, means for indicating said vernier pulse relative to a received echo from said distance and means for indicating the selected potential step and the selected variable potential to provide a measure of said selected distance.

11. In a radar system of the type wherein energy pulses are recurrently transmitted at a regular repetition rate and echo pulses are received from within a predetermined range in a chosen direction, a range selector to provide gated reception of echoes from any chosen distance in said range and to indicate and measure said distance comprising, means for generating in an interval corresponding to said maximum range during each time interval of said repetition a potential of saw tooth wave form and a sequence of time-spaced pulses representing a scale of distance, a source of control potential adjustable in steps, each potential step corresponding in order to a pulse in said sequence, means responsive to said saw tooth potential and a selected one of said potential steps to generate a selector pulse corresponding approximately to the major integral part of a chosen distance, said selector pulse having a duration encompassing a time interval during which a corresponding one of said time-spaced pulses occurs, means responsive to the coincidence of said selector pulse and said time-spaced pulses to select one of said time-spaced pulses corresponding exactly to said integral part of said chosen distance, means responsive to said selected pulse for generating a time base and a vernier pulse, said time base representing the interval between said selected pulse and the following pulse in said sequence, delay means comprising a potential varying means for adjusting the occurrence of said vernier pulse to a chosen time in said last named interval which correspond to the fractional or vernier part of said chosen distance, means for utilizing said vernier pulse to gate the reception of echo pulses for said distance, means for indicating said vernier pulse relative to a received echo pulse from said distance, and means for indicating the selected potential step and the selected variable potential to provide a measure of said selected distance.

12. In a radar system of the type wherein energy pulses are recurrently transmitted at a regular repetition rate and echo pulses are received from within a predetermined range in a chosen direction, a range selector to provide gated reception of echoes from any chosen distance in said range and to indicate and measure said distance comprising, means for generating, during each time interval of said repetition, a potential of saw tooth wave form and a sequence of time-spaced pulses representing a scale of distance a source of control potential adjustable in steps, each potential step corresponding in order to a pulse in said sequence, means responsive to said saw tooth potential and a selected one of said potential steps to generate a selector pulse corresponding approximately to the major integral part of a chosen distance, said selector pulse having a duration encompassing a time interval during which a corresponding one of said time-spaced pulses occurs, means responsive to the coincidence of said selector pulse and said time-spaced pulses to select one of said time-spaced pulses corresponding exactly to said integral part of said chosen distance, means responsive to said selected pulse for generating a time-base and a vernier pulse, said time base representing the interval between said selected pulse and the following pulse in said sequence, delay means comprising a variable potential for adjusting the occurrence of said vernier pulse to a chosen time in said last named interval which corresponds to the fractional or vernier part of said chosen distance, means for utilizing said vernier pulse to gate the reception of said radar for said distance, means for indicating said vernier pulse relative to a received echo from said distance, and means for indicating the selected potential step and the selected variable potential to provide a measure of said selected distance.

13. In a radar system of the type wherein energy pulses are recurrently transmitted at a regular repetition rate and echo pulses are received from within a predetermined range in a chosen direction, a range selector to provide gated reception of echoes from any chosen distance in said range and to indicate and measure said distance comprising, means for generating, during each time interval of said repetition a potential of saw tooth wave form and a sequence of time-spaced pulses representing a scale of distance, a source of control potential adjustable in steps, each potential step corresponding in order to a pulse in said sequence, means responsive to said saw tooth potential and a selected one of said potential steps to generate a selector pulse corresponding approximately to the major integral part of a chosen distance, said selector pulse having a duration encompassing a time interval during which a corresponding one of said time-spaced pulses occurs, means responsive to the coincidence of said selector pulse and said time-spaced pulses to select one of said time-spaced pulses corresponding exactly to said integral part of said chosen distance, means responsive to said selected pulse for generating a time base and a vernier pulse, said time base representing the interval between said selected pulse and the following pulse in said sequence, delay means comprising a variable potential for adjusting the occurrence of said vernier pulse to a chosen time in said last named interval to correspond to the fractional or vernier part of said chosen distance, means for indicating said vernier pulse relative to a received echo from said distance and means for indicating the selected potential step and the selected variable potential to provide a measure of said selected distance.

14. In a radar system of the type wherein energy pulses are recurrently transmitted at a regular repetition rate and echo pulses are received from within a predetermined range in a chosen direction, a range selector to provide gated reception of echoes from any chosen distance in said range and to indicate and measure said distance comprising, means for generating, during each time interval of said repetition, a potential of saw tooth wave form and a sequence of time-spaced pulses representing a scale of distance, a source of control potential adjustable in steps, each potential step corresponding in order to a pulse in said sequence, means responsive to said saw tooth potential and a selected one of said potential steps to generate a selector pulse corresponding approximately to the major integral part of a chosen distance, said selector pulse having a duration encompassing a time interval during which a corresponding one of said time-spaced pulses occurs, means responsive to the coincidence of said selector pulse and said time-spaced pulses to select one of said time-spaced pulses corresponding exactly to said integral part of said chosen distance, means responsive to said selected pulse for generating a time base and a vernier pulse, said time base representing the interval between said selected pulse and the following pulse in said sequence, delay means comprising a variable potential for adjusting the occurrence of said vernier pulse to a chosen time in said last named interval to correspond to the fractional or vernier part of said chosen distance, means for utilizing said vernier pulse to gate the reception of said radar for said distance and means for indicating the selected potential step and the selected variable potential to provide a measure of said selected distance.

15. In a radar system of the type wherein energy pulses are recurrently transmitted at a regular repetition rate and echo pulses are received from within a predetermined maximum range, a range selector to provide gated reception of echoes from any chosen distance in said range and to indicate and measure said distance comprising, means for generating, during each time interval of said repetition, a gating potential interval corresponding in time duration to said maximum range, means responsive to said gating for generating during said gating interval a sequence of time spaced pulses representing a scale of distance, means for selecting one of said time-spaced pulses corresponding to the major integral part of a chosen distance in said range, means responsive to said selected pulse to generate a vernier pulse, in adjustable time relation to said selected pulse, and means for utilizing said venier pulse to gate the reception of said radar for said distance and to indicate said distance.

16. In a radar system of the type wherein energy pulses are transmitted and echo pulses are received from within a predetermined maximum range, a range selector to provide gated reception of echoes from any chosen distance in said range and to indicate and measure said distance comprising, means for generating, during the time immediately following the transmission of a pulse, a gating potential interval corresponding in time duration to said maximum range, means responsive to said gating potential for generating during said gating interval a sequence of equally time-spaced pulses representing a scale of distance, said means comprising a normally inoperative generator of narrow pulses, means for selecting one of said time-spaced pulses corresponding to the major integral part of a chosen distance in said range, means responsive to said selected pulse to generate a vernier pulse having a chosen delay relative to said selected pulse which corresponds to the fractional or vernier part of said chosen distance, and means for utilizing said vernier pulse to gate the reception of said radar for said distance and to indicate said distance.

17. In a radar system of the type wherein energy pulses are transmitted and echo pulses are received from within a predetermined maximum range, a range selector of echoes from any chosen distance in said range comprising, means for generating, during a time interval immediately following the transmission of a pulse, a gating potential pulse corresponding in time duration to said maximum range, means responsive to said gating potential pulse for generating during said time interval a sequence of time spaced pulses representing a scale of distance, and means for selecting and utilizing one of said time-spaced pulses to provide an indication of said chosen distance in said range.

EDWIN G. SCHNEIDER.

References Cited in the file of this patent

UNITED STATES PATENTS

| Number | Name | Date |
| --- | --- | --- |
| 2,355,363 | Christaldi | Aug. 8, 1944 |
| 2,422,205 | Meacham | June 17, 1947 |
| 2,454,782 | De Rosa | Nov. 30, 1948 |
| 2,461,998 | Patterson | Feb. 15, 1949 |
| 2,471,408 | Busignies | May 31, 1949 |
| 2,474,291 | Busignies | June 28, 1949 |
| 2,534,862 | Fox | Dec. 19, 1950 |
| 2,542,032 | Isbister | Feb. 20, 1951 |

FOREIGN PATENTS

| Number | Country | Date |
| --- | --- | --- |
| 552,072 | Great Britain | Mar. 22, 1943 |